United States Patent
Yao et al.

(10) Patent No.: US 11,392,240 B2
(45) Date of Patent: Jul. 19, 2022

(54) INFORMATION PROCESSING APPARATUS, INFORMATION PROCESSING SYSTEM, AND CONTROL METHOD

(71) Applicant: Lenovo (Singapore) Pte. Ltd., Singapore (SG)

(72) Inventors: Qiang Yao, Kanagawa (JP); Yoshitsugu Suzuki, Kanagawa (JP); Ryohta Nomura, Kanagawa (JP); Seiichi Kawano, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/494,319

(22) Filed: Oct. 5, 2021

(65) Prior Publication Data

US 2022/0121310 A1    Apr. 21, 2022

(30) Foreign Application Priority Data

Oct. 19, 2020   (JP) .............................. JP2020-175460

(51) Int. Cl.
*G06F 3/041*    (2006.01)
(52) U.S. Cl.
CPC .. *G06F 3/0416* (2013.01); *G06F 2203/04105* (2013.01)
(58) Field of Classification Search
USPC ........................................................ 345/173
See application file for complete search history.

(56) References Cited

U.S. PATENT DOCUMENTS

| 9,529,525 B2 | 12/2016 | Skaljak et al. |
| 2010/0217957 A1* | 8/2010 | Berenbaum ............. G06F 9/455 718/1 |
| 2013/0181908 A1* | 7/2013 | Santiago ............... G06F 3/0488 345/173 |
| 2013/0314358 A1* | 11/2013 | Takano .................. G06F 3/041 345/173 |
| 2014/0085231 A1* | 3/2014 | Ootani ................... G06F 3/041 345/173 |
| 2015/0062021 A1* | 3/2015 | Skaljak .................. G06F 3/038 345/173 |

(Continued)

FOREIGN PATENT DOCUMENTS

| JP | H1-296478 A | 11/1989 |
| JP | 2014-092849 A | 5/2014 |

(Continued)

*Primary Examiner* — Chineyere D Wills-Burns
(74) *Attorney, Agent, or Firm* — Osha Bergman Watanabe & Burton LLP

(57) ABSTRACT

An information processing apparatus includes a display, a touch sensor disposed on a screen of the display unit detects an input position by an input medium on the screen, a main controller, and an embedded controller. The embedded controller predicts a subsequent input position of the input medium based on detected input positions of the input medium detected by the touch sensor at predetermined detection intervals, and output, to the main controller, the predicted subsequent input position as part of the detected input positions detected by the touch sensor. The main controller, based on the plurality of detected input positions received from the embedded controller, display a movement trajectory of the input medium on the screen.

9 Claims, 11 Drawing Sheets

(56) References Cited

U.S. PATENT DOCUMENTS

| | | | | |
|---|---|---|---|---|
| 2015/0309597 A1* | 10/2015 | Fujii | ................... | G06F 3/03545 |
| | | | | 345/173 |
| 2015/0324084 A1* | 11/2015 | Chen | ..................... | G06F 3/0416 |
| | | | | 345/173 |
| 2017/0160856 A1* | 6/2017 | Pillarisetty | .......... | G06F 3/04186 |
| 2018/0267761 A1* | 9/2018 | Aurongzeb | ........... | G06F 3/1423 |
| 2019/0129526 A1* | 5/2019 | Cheng | ..................... | G06F 3/041 |

FOREIGN PATENT DOCUMENTS

| | | | |
|---|---|---|---|
| JP | 2015-072534 A | | 4/2015 |
| JP | 2015-132921 A | | 7/2015 |
| JP | 2015-203915 A | | 11/2015 |
| JP | 2019-145058 A | | 8/2019 |

\* cited by examiner

| APID | AP NAME | PREDICTION FUNCTION | ... |
|---|---|---|---|
| AP001 | XYZ | PRESENT | ... |
| AP002 | ZZZZ | ABSENT | ... |
| ... | ... | ... | ... |
FIG. 3
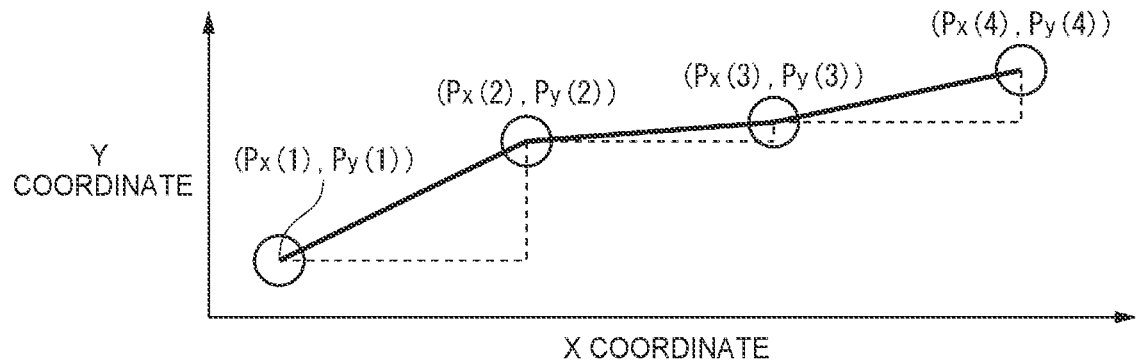
FIG. 4
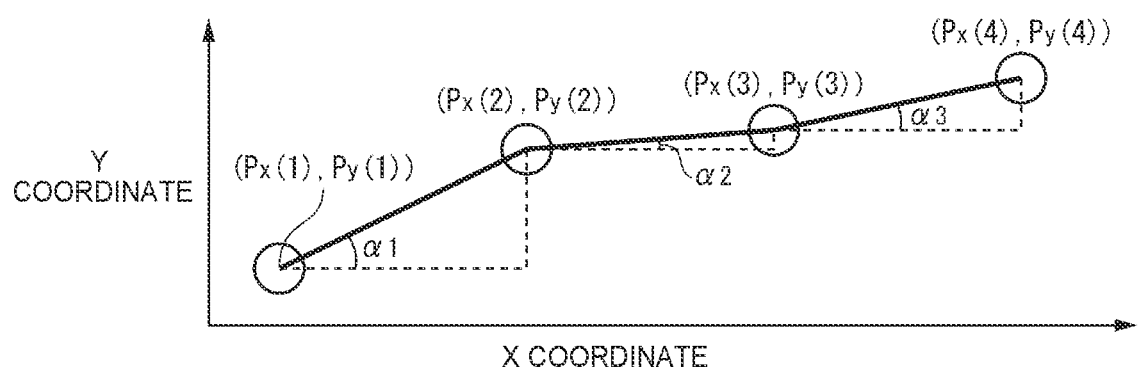
FIG. 5

| APID | AP NAME | PREDICTION SETTING | ... |
|---|---|---|---|
| AP001 | XYZ | WEAK | ... |
| AP002 | ZZZZ | STRONG | ... |
| AP003 | ABCD | DISABLED | ... |
| ... | ... | ... | ... |

INFORMATION PROCESSING APPARATUS, INFORMATION PROCESSING SYSTEM, AND CONTROL METHOD

CROSS-REFERENCE TO RELATED APPLICATIONS

This application claims priority to Japanese Patent Application No. 2020-175460 filed on Oct. 19, 2020, the content of which is incorporated herein by reference.

TECHNICAL FIELD

The present disclosure relates to an information processing apparatus, an information processing system, and a control method.

BACKGROUND

An information processing apparatus, such as a personal computer, may include an input device for handwriting input. In such an input device, it is desirable to display predicted input in order to reduce an input-to-display delay.

SUMMARY

According to one or more embodiments of the invention, an information processing apparatus includes a display, a touch sensor disposed on a screen of the display unit configured to detect an input position by an input medium on the screen, a main controller, and an embedded controller. The embedded controller is configured to predict a subsequent input position of the input medium based on a plurality of detected input positions of the input medium detected by the touch sensor at predetermined detection intervals, and output, to the main controller, the predicted subsequent input position as part of the plurality of detected input position detected by the touch sensor. The main controller is configured to, based on the plurality of detected input positions received from the embedded controller, display a movement trajectory of the input medium on the screen.

BRIEF DESCRIPTION OF THE DRAWINGS

FIG. 3 is a table illustrating a data example of an application information storage unit.

FIG. 4 is a chart for describing an example of a distance between detection positions.

FIG. 5 is a chart for describing an example of angle changes between detection positions.

DETAILED DESCRIPTION

An information processing apparatus, an information processing system, and a control method according to one or more embodiments of the present disclosure will be described below with reference to the accompanying drawings.

First Embodiment

Figure 1:
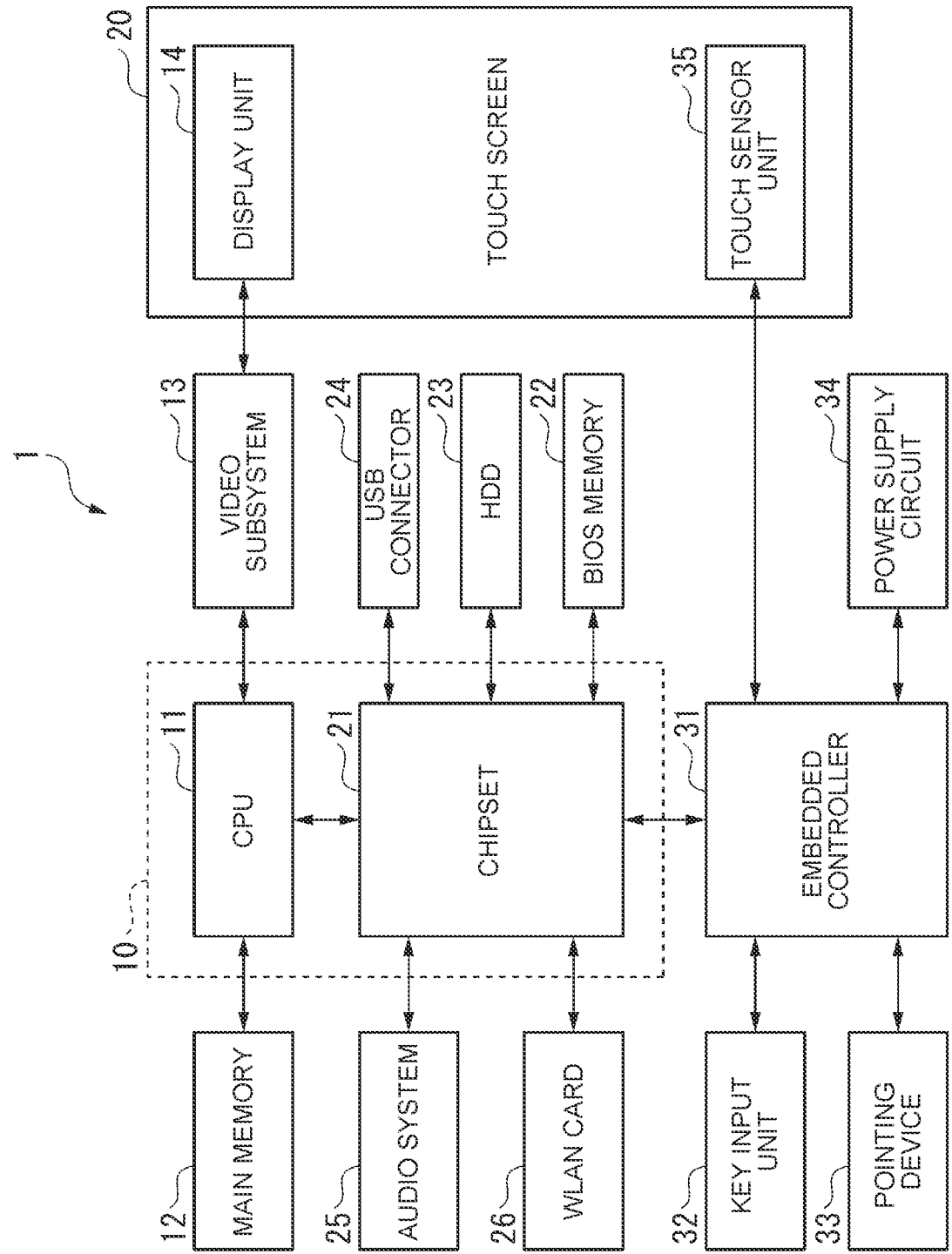
FIG. 1 is a diagram illustrating an example of the main hardware configuration of a laptop PC.

FIG. 1 is a diagram illustrating an example of the main hardware configuration of a laptop PC 1 (laptop personal computer) according to a first embodiment. Note that the laptop PC 1 will be described as an example of the information processing apparatus in the present embodiment.

As illustrated in FIG. 1, the laptop PC 1 includes a CPU 11, a main memory 12, a video subsystem 13, a display unit 14, a chipset 21, a BIOS memory 22, an HDD 23, a USB connector 24, an audio system 25, a WLAN card 26, an embedded controller 31, a key input unit 32, a pointing device 33, a power supply circuit 34, and a touch sensor unit 35.

The CPU (Central Processing Unit) 11 executes various kinds of arithmetic processing by program control to control the entire laptop PC 1.

The main memory 12 is a writable memory used as reading areas of execution programs of the CPU 11 or working areas to which processing data of the execution programs are written. The main memory 12 is configured, for example, to include plural DRAM (Dynamic Random Access Memory) chips. The execution programs include an OS (Operating System), various drivers for hardware-operating peripheral devices, various services/utilities, application programs, and the like.

The video subsystem 13 is a subsystem for realizing functions related to image display, which includes a video controller. This video controller processes a drawing command from the CPU 11, writes processed drawing information into a video memory, and reads this drawing information from the video memory and outputs it to the display unit 14 as drawing data (display data).

The display unit 14 is, for example, a liquid crystal display or an organic EL (Electro-Luminescence) display to display, as a main screen of the laptop PC 1, a display screen based on the drawing data (display data) output from the video subsystem 13.

The chipset 21 includes controllers, such as USB (Universal Serial Bus), serial ATA (AT Attachment), an SPI (Serial Peripheral Interface) bus, a PCI (Peripheral Component Interconnect) bus, a PCI-Express bus, and an LPC (Low Pin Count) bus, and plural devices are connected to the chipset 21. In FIG. 1, the BIOS memory 22, the HDD 23, the USB connector 24, the audio system 25, the WLAN card 26, and the embedded controller 31 are connected to the chipset 21 as examples of the devices.

The BIOS (Basic Input Output System) memory 22 is configured, for example, by an electrically rewritable non-volatile memory such as an EEPROM (Electrically Erasable Programmable Read Only Memory) or a flash ROM. The BIOS memory 22 stores a BIOS and system firmware for controlling the embedded controller 31 and the like.

The HDD (Hard Disk Drive) 23 (an example of a non-volatile storage device) stores the OS, various drivers, various services/utilities, application programs, and various data.

The USB connector 24 is a connector for connecting peripheral devices using the USB.

The audio system 25 records, plays back, and outputs sound data.

The WLAN (Wireless Local Area Network) card 26 is connected to a network by wireless LAN to perform data communication.

The embedded controller 31 (an example of an embedded control unit) is a one-chip microcomputer which monitors and controls various devices (peripheral devices, sensors, and the like) regardless of the system state of the laptop PC 1. Further, the embedded controller 31 has a power management function to control the power supply circuit 34. Note that the embedded controller 31 is configured to include a CPU, a ROM, a RAM, and the like, which are not illustrated, and is equipped with multi-channel A/D input terminal and D/A output terminal, a timer, and digital input/output terminals. To the embedded controller 31, for example, the key input unit 32, the pointing device 33, the power supply circuit 34, the touch sensor unit 35, and the like are connected through these input/output terminals, and the embedded controller 31 controls the operation of these units.

The key input unit 32 is an input device such as a keyboard or a touch panel to accept key input from a user. Further, the pointing device 33 is an input device, such as a mouse or a touch pad, to mainly accept the designation of a position on a display screen, and the designation or selection of an operation target (object) such as an operation button, and the like.

The power supply circuit 34 includes, for example, a DC/DC converter, a charge/discharge unit, a battery unit, an AC/DC adapter, and the like to convert DC voltage supplied from the AC/DC adapter or the battery unit into plural voltages required to operate the laptop PC 1. Further, the power supply circuit 34 supplies power to each unit of the laptop PC 1 under the control of the embedded controller 31.

Note that the CPU 11 and the chipset 21 described above correspond to a main control unit 10 in the present embodiment. The main control unit 10 executes processing based on the OS (for example, Windows (registered trademark)).

Further, the display unit 14 and the touch sensor unit 35 correspond to a touch screen 20.

The touch sensor unit 35 is, for example, an input device such as a touch panel, which is superimposed on the display unit 14. The touch sensor unit 35 is placed on the screen of the display unit 14 to detect a touch to an object on the screen of the display unit 14. The touch sensor unit 35 detects detection position data indicative of a position on the screen of the display unit 14 at which an operation medium such as a pen touches on the screen, and a touch pressure of the operation medium on the screen.

Figure 2:
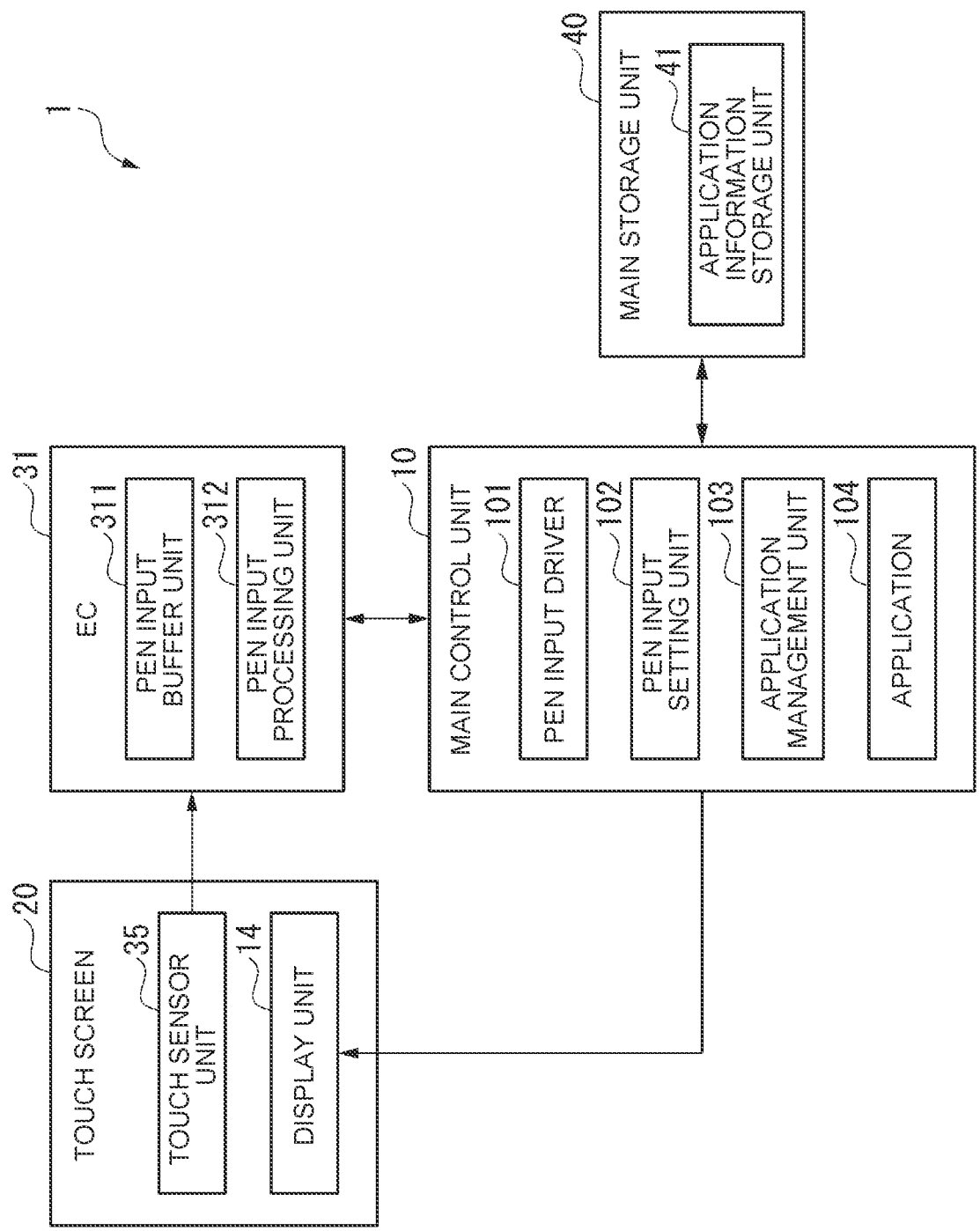
FIG. 2 is a block diagram illustrating an example of the functional configuration of the laptop PC.

Referring next to FIG. 2, the functional configuration of the laptop PC 1 according to the present embodiment will be described.

FIG. 2 is a block diagram illustrating an example of the functional configuration of the laptop PC 1 according to the present embodiment.

As illustrated in FIG. 2, the laptop PC 1 includes the main control unit 10, the touch screen 20, the embedded controller (EC) 31, and a main storage unit 40. Note that only the main functional configuration of the present embodiment is illustrated in FIG. 2 as the configuration of the laptop PC 1.

The main storage unit 40 is a storage unit realized by the main memory 12, the HDD 23, or the like to store various information used by the laptop PC 1. The main storage unit 40 includes an application information storage unit 41.

The application information storage unit 41 stores information related to applications executed on the OS. Here, a data example of the application information storage unit 41 will be described with reference to FIG. 3.

FIG. 3 is a table illustrating the data example of the application information storage unit 41 in the present embodiment.

As illustrated in FIG. 3, the application information storage unit 41 stores APID, AP name, and prediction function in association with one another. Here, the APID is identification information for identifying an application, that is, an application ID. Further, the AP name indicates the name of the application. Further, the prediction function indicates whether or not there is a function for executing prediction processing of detection position data inside the application when the application performs pen input processing (handwriting input processing). When the prediction function is "present," it means that prediction processing of detection position data is executed inside the application, while when the prediction function is "absent," it means that the prediction processing of detection position data is not executed inside the application.

For example, in the example illustrated in FIG. 3, in a case of an application whose APID and AP name are "AP001" and "XYZ," the prediction function is "present" (which means to execute the prediction processing). Further, in a case of an application whose PAID and AP name are "AP002" and "ZZZZ," the prediction function is "absent" (which means not to execute the prediction processing).

Returning to FIG. 2, the main control unit 10 is a functional unit implemented by the CPU 11 and the chipset 21 executing various processing stored in the main memory 12 to execute various processing based on the OS. For example, based on detection position data output from the embedded controller 31, the main control unit 10 displays, on the display unit 14, a movement trajectory of the operation medium such as the pen on the screen as such a trajectory that the operation medium was moved while touching on the screen. Further, the main control unit 10 includes a pen input driver 101, a pen input setting unit 102, an application management unit 103, and an application 104.

The pen input driver 101 is a functional unit implemented by the CPU 11 and the chipset 21 to control pen input processing (handwriting input processing) by the touch screen 20. The pen input driver 101 acquires, from the embedded controller 31, detection position data on the screen of the display unit 14 detected by the touch sensor unit 35, and outputs the detection position data to the application 104.

In response to a change request from the user, for example, the pen input setting unit 102 transmits, to the embedded controller 31, changes in prediction processing settings of position detection data to be described later (for example, enabled or disabled, parameter and level settings of the prediction processing, and the like).

The application management unit 103 monitors applications executed on the OS, and when an application in which prediction processing of detection position data (for example, prediction of next-time detection position data) is performed inside the application is launched, the application management unit 103 transmits, to the embedded controller 31, a notification to limit the prediction processing. When an application to be executed on the OS is launched, the application management unit 103 refers to the application information storage unit 41 described above to check on the prediction function corresponding to the launched application (APID and AP name). When the prediction function is "present," the application management unit 103 transmits, to the embedded controller 31, a notification to stop the prediction processing (for example, a disable notification to disable the prediction processing).

Further, the application management unit 103 refers to the application information storage unit 41 to check on the prediction function corresponding to the launched application (APID and AP name). When the prediction function is "absent," the application management unit 103 transmits, to the embedded controller 31, a notification to operate the prediction processing (for example, an enable notification to enable the prediction processing).

The application 104 is an application to be executed on the OS, for example, which is an application to execute pen input processing (handwriting input processing) using the touch screen 20. Note that a case where the application 104 has the prediction function to internally predict detection position data and a case where the application 104 does not have the prediction function are considered.

The application 104 acquires detection position data of the display unit 14 output from the embedded controller 31 through the pen input driver 101, and based on the acquired detection position data, the application 104 displays, on the display unit 14, the movement trajectory of the operation medium such as the pen on the screen as such a trajectory that the operation medium was moved while touching on the screen.

The embedded controller 31 is an embedded control unit different from the main control unit 10. Based on plural pieces of detection position data on the screen detected by the touch sensor unit 35 at predetermined detection intervals as a result of touching on the screen of the display unit 14 with the operation medium such as the pen, the embedded controller 31 predicts next-time detection position data. The embedded controller 31 outputs, to the main control unit 10, the predicted next-time detection position data as detection position data detected by the touch sensor unit 35.

Further, the embedded controller 31 includes a pen input buffer unit 311 and a pen input processing unit 312.

The pen input buffer unit 311 stores, in chronological order, detection position data detected by the touch sensor unit 35 of the touch screen 20 at the predetermined detection intervals. For example, the pen input buffer unit 311 stores two-dimensional coordinate data on the screen of the display unit 14 as position detection data, and a touch pressure in association with each other.

The pen input processing unit 312 stores, in the pen input buffer unit 311, detection position data detected by the touch sensor unit 35 at each predetermined detection interval, and a touch pressure.

Further, in response to a setting change request from the pen input setting unit 102 of the main control unit 10, the pen input processing unit 312 changes the settings of the prediction processing of position detection data (for example, enabled or disabled, parameter and level settings of the prediction processing, and the like).

Based on the plural pieces of detection position data stored in the pen input buffer unit 311, the pen input processing unit 312 predicts next-time detection position data and outputs, to the main control unit 10, the predicted next-time detection position data as detection position data detected by the touch sensor unit 35. Note that when the prediction processing of detection position data is not performed, the pen input processing unit 312 outputs, to the main control unit 10, the latest position detection data stored in the pen input buffer unit 311 as detection position data detected by the touch sensor unit 35. Here, the pen input processing unit 312 switches whether or not to output the predicted next-time detection position data as detection position data according to predetermined executability conditions (criteria) below. In other words, the pen input processing unit 312 switches whether or not to perform the prediction processing of detection position data according to the executability conditions (criteria) below.

A first executability condition is such a case that distance between detection positions in the plural pieces of detection position data is a predetermined threshold distance or more. When the distance between detection positions in the plural pieces of detection position data stored in the pen input buffer unit 311 is the predetermined threshold distance or more, the pen input processing unit 312 executes the prediction processing and outputs the predicted next-time detection position data as detection position data. Referring here to FIG. 4, details of processing related to the first executability condition will be described.

FIG. 4 is a chart for describing an example of the distance between detection positions in the present embodiment.

In FIG. 4, it is assumed that the graph represents a two-dimensional space of the screen of the display unit 14, and detection position data of detection positions P(1) to P(4) are stored in the pen input buffer unit 311.

Here, detection position data at a detection position P(i) is represented as ($P_x(i)$, $P_y(i)$).

For example, the pen input processing unit 312 generates a distance D between detection positions from detection position data of P(1) to P(4) by using Equation (1) below.

$$D = \sum_{i=1}^{N-1}(|P_x(i+1)-P_x(i)|+|P_y(i+1)-P_y(i)|) \quad (1)$$

For example, the distance D between detection positions corresponds to a total movement distance of plural pieces (for example, four pieces) of detection position data stored in the pen input buffer unit 311.

The pen input processing unit 312 determines whether or not the distance D between detection positions generated by Equation (1) is the predetermined threshold distance or more (threshold distance $Th_D$ or more). When the distance D between detection positions is the predetermined threshold distance or more (threshold distance $Th_D$ or more), the pen input processing unit 312 executes the prediction processing to predict next-time detection position data based on the plural pieces (for example, four pieces) of detection position data. In this case, the pen input processing unit 312 outputs, to the main control unit 10, the predicted next-time detection position data as detection position data.

Note that when the distance D between detection positions is less than the predetermined threshold distance (less than threshold distance $Th_D$), the pen input processing unit 312 outputs, to the main control unit 10, the latest detection position data among the plural pieces (for example, four pieces) of detection position data stored in the pen input buffer unit 311 as detection position data without executing the prediction processing.

Figure 6:
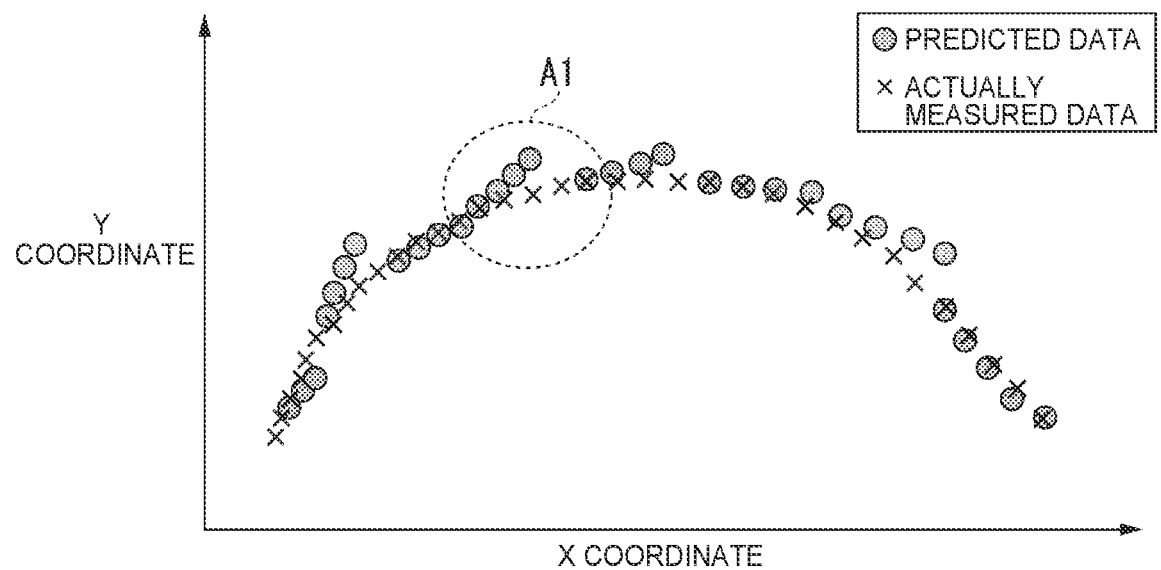
FIG. 6 is a chart illustrating a relationship between angle change in detection position and prediction processing.

Further, a second executability condition is a change in moving angle of the operation medium at each of the predetermined detection intervals based on the plural pieces of detection position data. When the change in moving angle of the operation medium such as the pen based on the plural pieces of detection position data stored in the pen input buffer unit 311 is a predetermined threshold value or more, the pen input processing unit 312 outputs, as detection position data, the latest detection position data detected by the touch sensor unit 35, and does not output the predicted next-time detection position data as detection position data. Referring here to FIG. 5 and FIG. 6, details of processing related to the second executability condition will be described.

FIG. 5 is a chart for describing an example of angle changes between detection positions in the present embodiment.

In FIG. 5, angle $\alpha_1$ to angle $\alpha_3$ represent angles of pen input between detection positions P(1) to P(4).

For example, the pen input processing unit 312 generates angle $\alpha_1$ to angle $\alpha_3$ by using Equation (2) below. Further, the pen input processing unit 312 generates an angle change dispersion VA as a variation in angle changes by using Equation (3) and Equation (4) below.

$$\alpha_i = \tan^{-1} \frac{P_y(i+1) - P_y(i)}{P_x(i+1) - P_x(i)} \quad (2)$$

$$\mu = \frac{1}{N-1} \sum_{i=1}^{N-1} (\alpha_{i+1} - \alpha_i) \quad (3)$$

$$VA = \frac{1}{N-1} \sum_{i=1}^{N-1} (\Delta \alpha_i - \mu)^2 \quad (4)$$

Note that $\mu$ in Equation (3) and Equation (4) described above denotes an average value of angle changes and $\Delta\alpha_i$ denotes the amount of angle change $(\alpha_{i+1}-\alpha_i)$. Further, N denotes the number of samples of detection position data.

The pen input processing unit 312 determines whether or not the angle change dispersion VA generated by using Equation (2) to Equation (4) is a predetermined threshold value or more (threshold value $Th_{angle}$ or more). When the angle change dispersion VA is the predetermined threshold value or more (threshold value $Th_{angle}$ or more), the pen input processing unit 312 outputs, as detection position data, the latest detection position data detected by the touch sensor unit 35, and does not output the predicted next-time detection position data as detection position data. In other words, when the angle change of detection position data is the predetermined threshold value or more, the pen input processing unit 312 outputs, to the main control unit 10, the latest detection position data among the plural pieces (for example, four pieces) of detection position data stored in the pen input buffer unit 311 as detection position data without executing the prediction processing.

Further, when the angle change dispersion VA is less than the predetermined threshold value (less than the threshold value $Th_{angle}$), the pen input processing unit 312 executes the prediction processing and outputs, to the main control unit 10, predicted next-time detection position data as detection position data.

FIG. 6 is a chart illustrating a relationship between angle change between detection positions and prediction processing in the present embodiment.

In FIG. 6, cross mark points represent actually measured data of detection position data, and halftone circle points represent predicted data by the prediction processing. As illustrated in a range A1 of pen input, when the angle change is large, it can be considered that the predicted data (halftone circle points) deviates greatly from the actually measured data (cross mark points). Therefore, when the angle change dispersion VA is the predetermined threshold value or more (the threshold value $Th_{angle}$ or more), the pen input processing unit 312 in the present embodiment stops the execution of the prediction processing.

Figure 7:
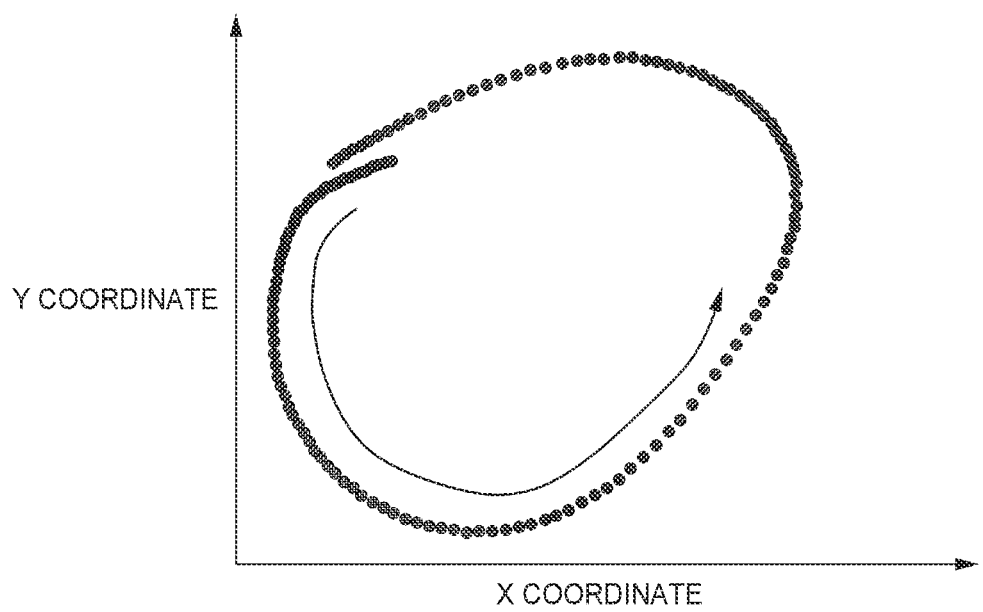
FIG. 7 is a first chart illustrating a relationship between detection position and pressure.
Figure 8:
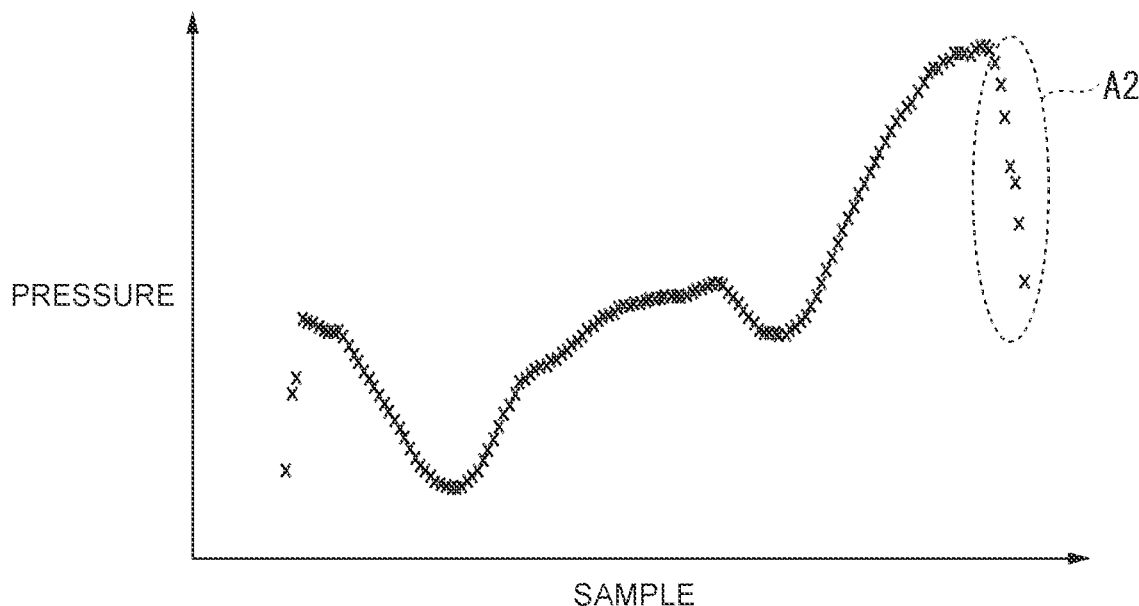
FIG. 8 is a second chart illustrating the relationship between detection position and pressure.

Further, a third executability condition is such a case that a touch pressure drop corresponding to plural pieces of detection position data is a predetermined reference value or more. When the touch pressure drop is the predetermined reference value or more, the pen input processing unit 312 outputs, as detection position data, the latest detection position data detected by the touch sensor unit 35, and does not output predicted next-time detection position data as detection position data. Referring here to FIG. 7 and FIG. 8, details of processing related to the third executability condition will be described.

FIG. 7 and FIG. 8 are charts illustrating a relationship between detection position and pressure in the present embodiment. The example of pen input illustrated in FIG. 7 represents detection positions in a case where pen input was performed to draw a circle counterclockwise. Further, the graph in FIG. 8 illustrates touch pressure corresponding to pen input illustrated in FIG. 7. As illustrated in the graph of FIG. 8, the touch pressure drops in an end-section range A2 as a result of performing pen input to draw the circle illustrated in FIG. 7. Thus, the touch pressure drops in the end section of pen input. Therefore, when the touch pressure drop is the predetermined reference value or more, the pen input processing unit 312 determines that it is the end section of pen input, and stops the execution of the prediction processing of detection position data.

Specifically, for example, the pen input processing unit 312 generates an average value $A_{diff}$ of touch pressure drops from plural touch pressure values $A_i$ stored in the pen input buffer unit 311 by Equation (5) below.

$$A_{diff} = \frac{1}{N-1} \sum_{i=1}^{N-1} (A_i - A_{i+1}) \quad (5)$$

The pen input processing unit 312 determines whether or not the average value $A_{diff}$ of touch pressure drops generated by Equation (5) is the predetermined reference value or more. When the average value $A_{diff}$ of touch pressure drops is the predetermined reference value or more, the pen input processing unit 312 determines that it is near the end section of pen input, and stops the prediction processing and outputs, to the main control unit 10, the latest detection position data among the plural pieces (for example, four pieces) of detection position data stored in the pen input buffer unit 311 as detection position data.

Further, when the average value $A_{diff}$ of touch pressure drops is less than the predetermined reference value, the pen input processing unit 312 executes the prediction processing and outputs, to the main control unit 10, predicted next-time detection position data as detection position data.

Thus, the pen input processing unit 312 executes the prediction processing according to the executability conditions such as the first executability condition to the third executability condition described above to switch whether or not to output predicted next-time detection position data as detection position data.

Further, in response to the notification to limit the prediction processing, the pen input processing unit 312 limits the prediction processing. For example, the notification to limit the prediction processing includes a notification to stop the prediction processing (prediction disable notification). In response to the notification (prediction disable notification) to stop the prediction processing function received from the main control unit 10, the embedded controller 31 stops the prediction processing and outputs, as detection position data, the latest detection position data detected by the touch sensor unit 35. In other words, for example, when the application 104 internally has the prediction function of detection position data, the pen input processing unit 312 stops the prediction processing to avoid duplicate prediction processing.

Next, the operation of the laptop PC 1 according to the present embodiment will be described with reference to the accompanying drawings.

Figure 9:
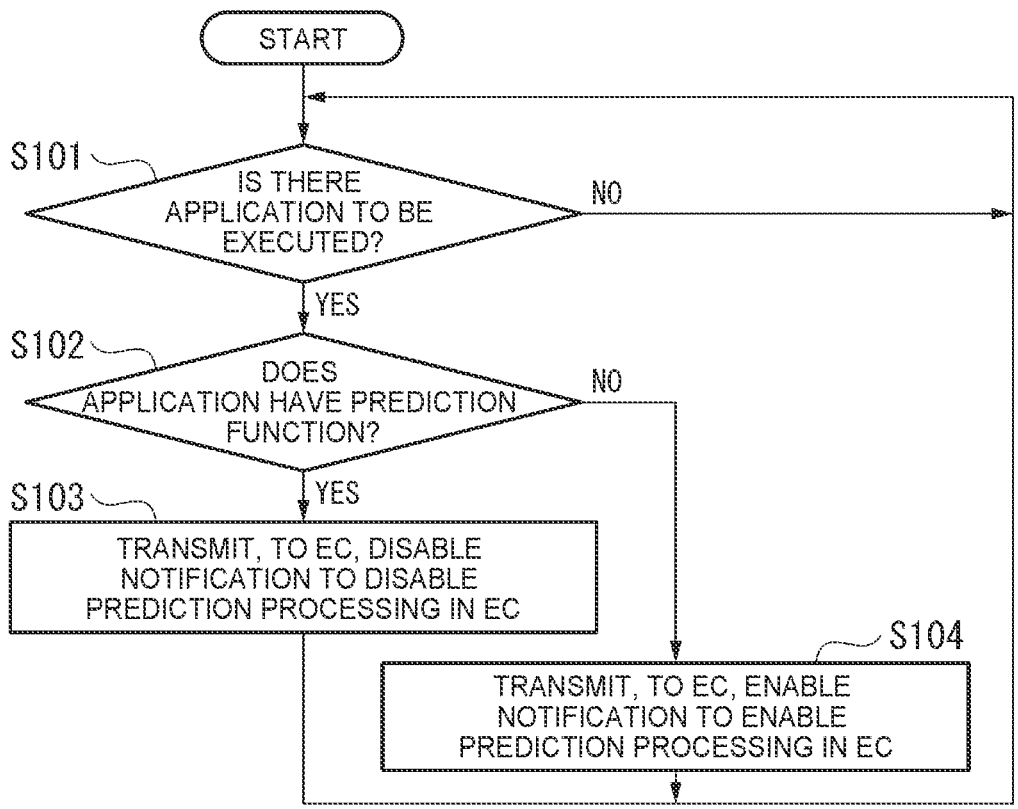
FIG. 9 is a flowchart illustrating an example of the operation of a main control unit.

FIG. 9 is a flowchart illustrating an example of the operation of the main control unit 10 in the present embodiment. Referring here to FIG. 9, processing performed by the main control unit 10 to monitor applications and transmits a notification to instruct the side of the embedded controller 31 on whether or not to perform the prediction processing of detection position data will be described.

As illustrated in FIG. 9, the main control unit 10 first determines whether or not there is an application to be executed (step S101). The application management unit 103 of the main control unit 10 monitors applications executed on the OS and determines whether or not there is an application to be executed. When there is an application to be executed (there is an application to be launched) (step S101: YES), the application management unit 103 proceeds to a process in step S102. On the other hand, when there is no application to be executed (there is no application to be launched) (step S101: NO), the application management unit 103 returns to the process in step S101.

In step S102, the application management unit 103 determines whether or not the application (for example, the application 104) to be executed (launched) has the prediction function of detection position data. Here, the application management unit 103 refers to the application information storage unit 41 as illustrated in FIG. 3 to determine whether or not there is the prediction function of detection position data. When the application 104 to be executed (launched) has the prediction function (step S102: YES), the application management unit 103 proceeds to a process in step S103. On the other hand, when the application 104 to be executed (launched) does not have the prediction function (step S102: NO), the application management unit 103 proceeds to a process in step S104.

In step S103, the application management unit 103 transmits, to the embedded controller 31, the disable notification to disable the prediction processing in the embedded controller 31 (prediction disable notification). After the process in step S103, the application management unit 103 returns to the process in step S101.

Further, in step S104, the application management unit 103 transmits, to the embedded controller 31, the enable notification to enable the prediction processing in the embedded controller 31. After the process in step S103, the application management unit 103 returns to the process in step S101.

Figure 10:
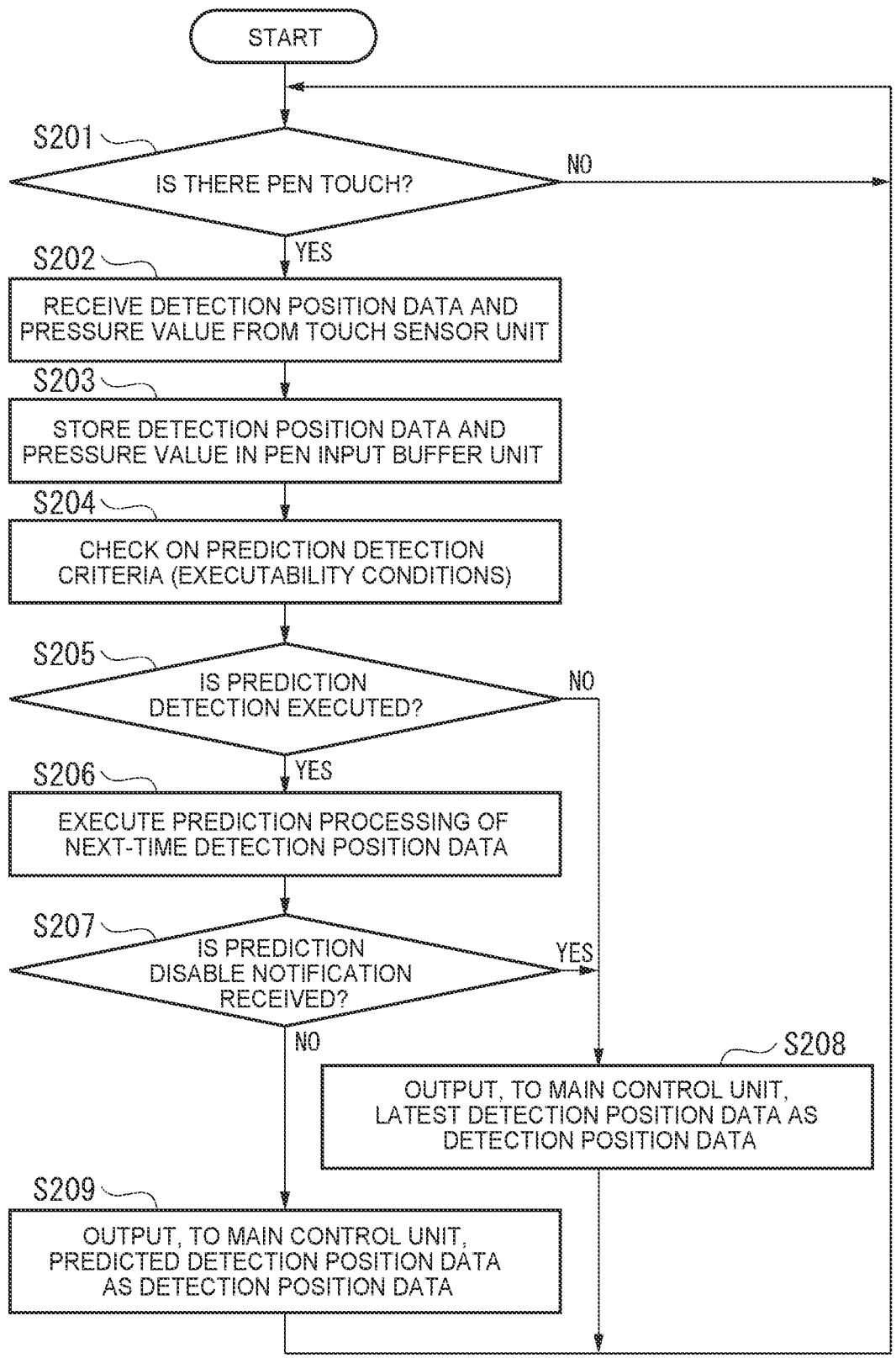
FIG. 10 is a flowchart illustrating an example of the operation of an embedded controller.

Referring next to FIG. 10, the operation of the embedded controller 31 in the present embodiment will be described.

FIG. 10 is a flowchart illustrating an example of the operation of the embedded controller 31 in the present embodiment. Note that the description will be made here by taking, as an example, a case of using the pen as the operation medium to perform pen input to the touch screen 20.

As illustrated in FIG. 10, the embedded controller 31 first determines whether or not there is a pen touch on the touch sensor unit 35 (step S201). The pen input processing unit 312 of the embedded controller 31 determines whether or not there is a pen touch on the touch sensor unit 35. When there is a pen touch on the touch sensor unit 35 (step S201: YES), the pen input processing unit 312 proceeds to a process in step S202. On the other hand, when there is no pen touch on the touch sensor unit 35 (step S201: NO), the pen input processing unit 312 returns to the process in step S201.

In step S202, the pen input processing unit 312 receives detection position data and a pressure value (touch pressure value) from the touch sensor unit 35.

Next, the pen input processing unit 312 stores, in the pen input buffer unit 311, the received detection position data and pressure value (step S203).

Next, the pen input processing unit 312 checks on the prediction detection criteria (executability conditions) (step S204). For example, the pen input processing unit 312 checks whether or not to execute the prediction processing (prediction detection) of detection position data according to three executability conditions of the first executability condition to the third executability condition described above.

Next, the pen input processing unit 312 determines whether or not to execute prediction detection (step S205). The pen input processing unit 312 determines whether or not to execute the prediction processing of detection position data according to the first executability condition to the third executability condition. When the prediction processing of detection position data is executed (step S205: YES), the pen input processing unit 312 proceeds to a process in step S206. On the other hand, when the prediction processing of detection position data is not executed (step S205: NO), the pen input processing unit 312 proceeds to a process in step S208.

In step S206, the pen input processing unit 312 executes the prediction processing of next-time detection position data. Based on the plural pieces of detection position data stored in the pen input buffer unit 311, the pen input processing unit 312 generates the next-time detection position data (coordinate data on the screen of the display unit 14).

Next, the pen input processing unit 312 determines whether or not the prediction disable notification is received (step S207). For example, when the prediction disable notification is received from the main control unit immediately before the determination, the pen input processing unit 312 determines that the prediction disable notification is received, while when the prediction enable notification is received from the main control unit 10 immediately before the determination, the pen input processing unit 312 determines that the prediction disable notification is not received. When the prediction disable notification is received (step S207: YES), the pen input processing unit 312 proceeds to the process in step S208. On the other hand, when the prediction disable notification is not received (step S207: NO), the pen input processing unit 312 proceeds to a process in step S209.

In step S208, the pen input processing unit 312 outputs, to the main control unit 10, the latest detection position data as detection position data. In other words, the pen input processing unit 312 outputs, to the main control unit 10, the latest detection position data among the plural pieces of detection position data stored in the pen input buffer unit 311. After the process in step S208, the pen input processing unit 312 returns to the process in step S201.

Further, in step S209, the pen input processing unit 312 outputs, to the main control unit 10, predicted detection position data as detection position data. Note that in a case immediately after the prediction processing is enabled, the pen input processing unit 312 outputs, to the main control unit 10, both the latest detection position data among the plural pieces of detection position data stored in the pen input buffer unit 311 and the predicted detection position data as detection position data. After the process in step S209, the pen input processing unit 312 returns to the process in step S201.

Figure 11:
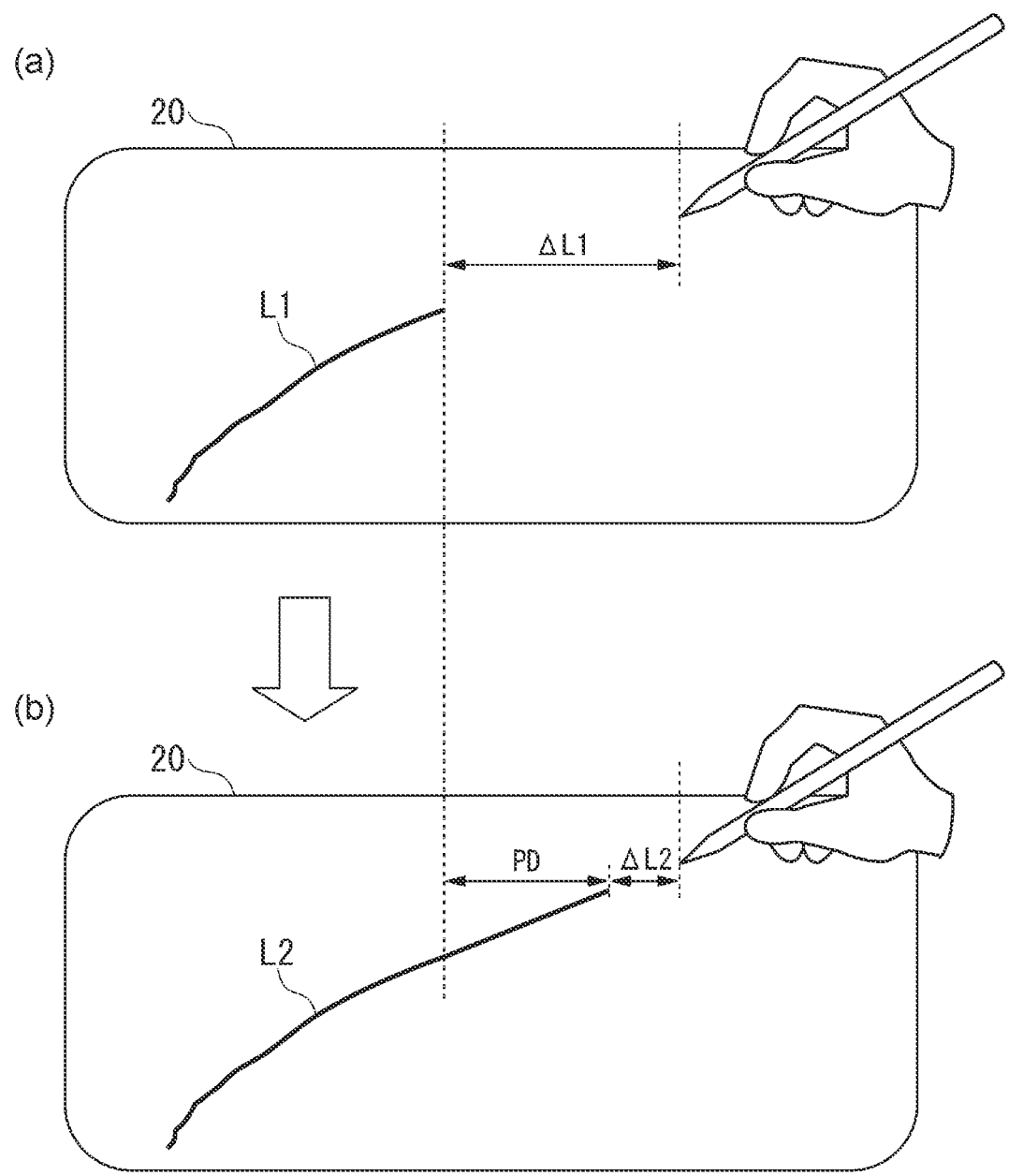
FIG. 11 is a diagram illustrating an example of the operation of prediction processing of handwriting input.

FIG. 11 is a diagram illustrating an example of the operation of the prediction processing of handwriting input in the present embodiment.

FIG. 11(a) illustrates a display example of pen input when the prediction processing of detection position data by the embedded controller 31 is not executed. In FIG. 11(a), a display line L1 represents a trajectory line of pen movement on the screen of the touch screen 20, and there is a distance ΔL1 as a time lag between the actual pen position and the display position of the latest display line L1.

Further, FIG. 11(b) illustrates a display example of pen input when the prediction processing of detection position data by the embedded controller 31 is executed. In FIG. 11(b), a display line L2 represents a trajectory line of pen movement on the screen of the touch screen 20, and there is a distance ΔL2 as a time lag between the actual pen position and the display position of the latest display line L2. In the example illustrated in FIG. 11(b), a section of distance PD is generated by the embedded controller 31 performing the prediction processing. Therefore, since the distance ΔL2 as the time lag becomes shorter than the distance ΔL1 illustrated in FIG. 11(a) when the prediction processing is not executed, a display delay can be reduced.

As described above, the laptop PC 1 (information processing apparatus) according to the present embodiment includes the display unit 14, the touch sensor unit 35, the main control unit 10, and the embedded controller 31 (embedded control unit). The touch sensor unit 35 is placed on the screen of the display unit 14 to detect a touch to an object on the screen of the display unit 14. The main control unit 10 executes processing based on the OS. The embedded controller 31 is the embedded control unit different from the main control unit 10 to predict next-time detection position data based on plural pieces of detection position data detected by the touch sensor unit 35 at predetermined detection intervals as a result of touching on the screen with the operation medium (for example, a pen or a finger) and output, to the main control unit 10, the predicted next-time detection position data as detection position data detected by the touch sensor unit 35. Based on the detection position data output from the embedded controller 31, the main control unit 10 displays, on the display unit 14, a movement trajectory of the operation medium (for example, the pen or the finger) moved on the screen while touching on the screen.

Thus, in the laptop PC 1 according to the present embodiment, the embedded controller 31 as the embedded control unit different from the main control unit 10 predicts detection position data to make it unnecessary for the OS side (main control unit 10) to predict detection position data. Therefore, the laptop PC 1 according to the present embodiment can reduce an input-to-display delay in handwriting input without depending on the application executed on the OS.

Further, in the present embodiment, the embedded controller 31 switches whether or not to output predicted next-time detection position data as detection position data according to the predetermined executability conditions (for example, the first executability condition to the third executability condition described above). In other words, the embedded controller 31 switches whether or not to execute the prediction processing according to the executability conditions (for example, the first executability condition to the third executability condition described above).

Thus, the laptop PC 1 according to the present embodiment can switch whether or not to execute the prediction processing properly according to the executability conditions. For example, when the effect of the prediction processing is large, the prediction processing can be executed, while when the effect of the prediction processing is small or when the prediction accuracy is low, the execution of the prediction processing can be disabled. Therefore, the laptop PC 1 according to the present embodiment can utilize the prediction processing properly.

Further, in the present embodiment, the executability conditions include a case where a distance between detection positions in the plural pieces of detection position data is the predetermined threshold distance or more (first executability condition). When the distance between detection positions is the predetermined threshold distance or more, the embedded controller 31 outputs predicted next-time detection position data as detection position data.

Thus, the laptop PC 1 according to the present embodiment can execute the prediction processing properly when the distance between detection positions is large.

Further, in the present embodiment, the executability conditions include a case where a change in moving angle of the operation medium at each of predetermined detection intervals based on the plural pieces of detection position data is a predetermined threshold value or more (second executability condition). When the change in moving angle is the predetermined threshold value or more, the embedded controller 31 outputs, as detection position data, the latest detection position data detected by the touch sensor unit 35, and does not output predicted next-time detection position data as detection position data.

Thus, the laptop PC 1 according to the present embodiment can respond properly without executing the prediction processing when the prediction accuracy is low, such as when the drawing angle is largely changed in handwriting input.

Further, in the present embodiment, the touch sensor unit 35 detects a touch pressure of the operation medium on the screen together with the detection position data. The executability conditions include a case where a touch pressure drop corresponding to the plural pieces of detection position data is a predetermined reference value or more (third executability condition). When the touch pressure drop is the predetermined reference value or more, the embedded controller 31 outputs, as detection position data, the latest detection position data detected by the touch sensor unit 35, and does not output predicted next-time detection position data as detection position data.

Thus, the laptop PC 1 according to the present embodiment can respond properly without executing the prediction processing when the prediction accuracy is low, for example, near the end section in which the touch pressure drop tends to be large in handwriting input (pen input) or the like.

Further, in the present embodiment, the main control unit 10 monitors applications executed on the OS, and when an application in which the prediction of next-time detection position data is performed inside the application is launched, the main control unit 10 transmits, to the embedded controller 31, a notification to limit the prediction processing for predicting the next-time detection position data. In response to the notification to limit the prediction processing, the embedded controller 31 limits the prediction processing.

Thus, the laptop PC 1 according to the present embodiment can limit the prediction processing depending on the application. For example, even when the prediction processing is executed inside the application, proper handwriting input (pen input) can be realized.

Further, in the present embodiment, the notification to limit the prediction processing includes a notification to stop the prediction processing. In response to the notification to stop the function of the prediction processing (prediction disable notification), the embedded controller 31 stops the prediction processing and outputs, as detection position data, the latest detection position data detected by the touch sensor unit 35.

Thus, the laptop PC 1 according to the present embodiment can suppress the occurrence of an abnormality in the display of handwriting input (pen input) by the embedded controller 31 and an application (for example, the application 104) executing the prediction processing of detection position data in a duplicate manner.

Further, a control method according to the present embodiment is a control method of the laptop PC 1 (information processing apparatus) including the display unit 14, the touch sensor unit 35 placed on the screen of the display unit 14 to detect a touch to an object on the screen, the main control unit 10 which executes processing based on the OS, and the embedded controller 31 different from the main control unit 10. The control method includes a first step and a second step. In the first step, the embedded controller 31 predicts next-time detection position data based on the plural pieces of detection position data on the screen detected by the touch sensor unit 35 at the predetermined detection intervals as a result of touching on the screen with the operation medium, and outputs, to the main control unit 10, the predicted next-time detection position data as detection position data detected by the touch sensor unit 35. In the second step, based on the detection position data output from the embedded controller 31, the main control unit 10 displays, on the display unit 14, a movement trajectory of the operation medium moved on the screen while touching on the screen.

Thus, the control method according to the present embodiment has the same effect as the laptop PC 1 described above, and an input-to-display delay in handwriting input can be reduced without depending on the application executed on the OS.

Second Embodiment

Next, a laptop PC 1*a* according to a second embodiment will be described with reference to the accompanying drawings.

In the present embodiment, a modification when the setting of prediction processing is changed depending on the application will be described.

Figure 12:
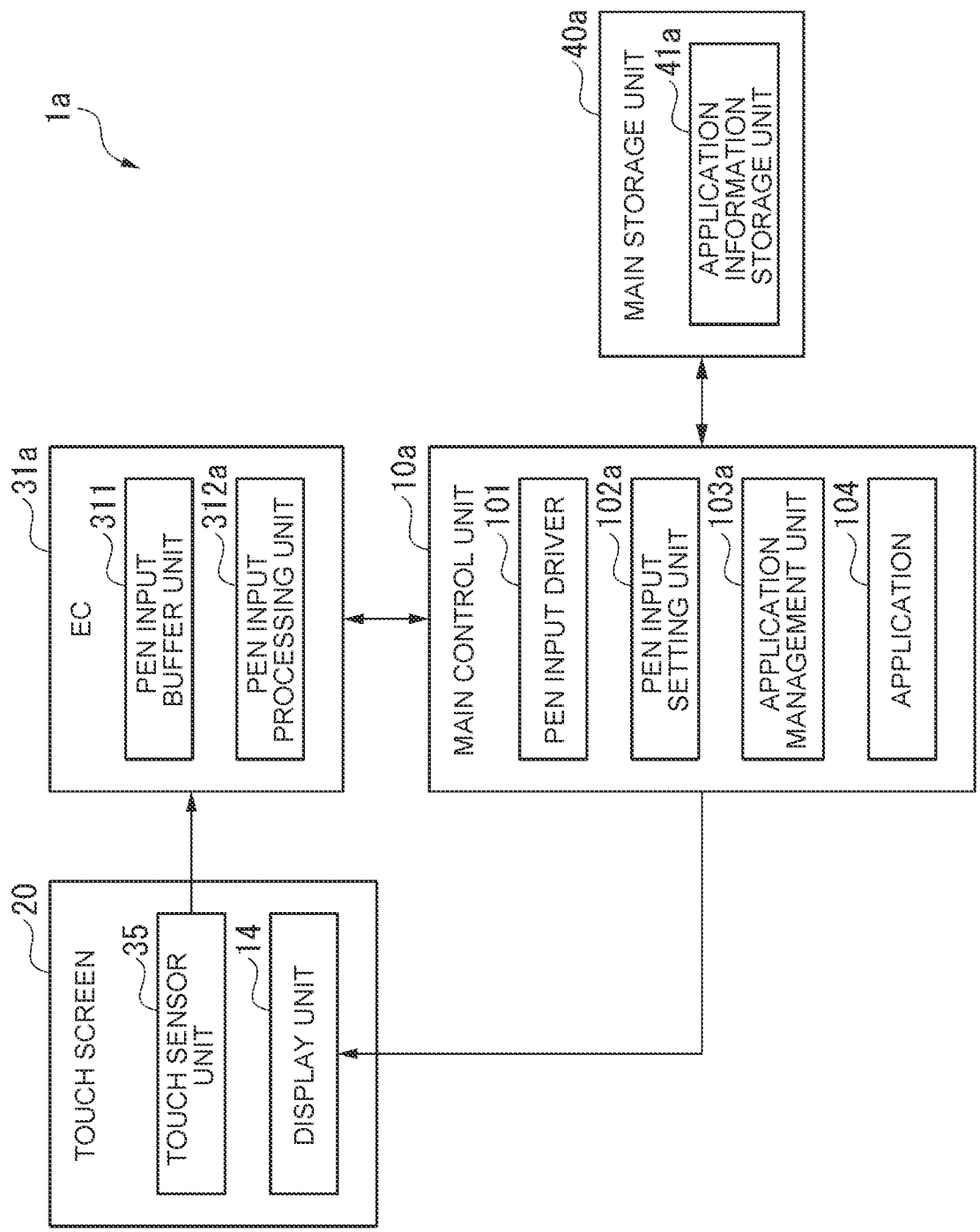
FIG. 12 is a block diagram illustrating an example of the functional configuration of a laptop PC.

FIG. 12 is a block diagram illustrating an example of the functional configuration of the laptop PC 1*a* according to the second embodiment. Note that the main hardware configuration of the laptop PC 1*a* according to the present embodiment is the same as that in the first embodiment illustrated in FIG. 1 described above, the description thereof will be omitted here.

As illustrated in FIG. 12, the laptop PC 1*a* includes a main control unit 10*a*, the touch screen 20, an embedded controller (EC) 31*a*, and a main storage unit 40*a*. Note that only the main functional configuration of the present embodiment is illustrated in FIG. 12 as the configuration of the laptop PC 1*a*.

Note further that the same components as those of the laptop PC 1 of the first embodiment illustrated in FIG. 2 are given the same reference numerals in FIG. 12 to omit the description thereof.

The main storage unit 40*a* is a storage unit realized by the main memory 12, the HDD 23, or the like to store various information used by the laptop PC 1*a*. The main storage unit 40*a* includes an application information storage unit 41*a*.

The application information storage unit 41*a* stores information related to applications executed on the OS. Here, a data example of the application information storage unit 41*a* will be described with reference to FIG. 13.

Figures 13, 14:
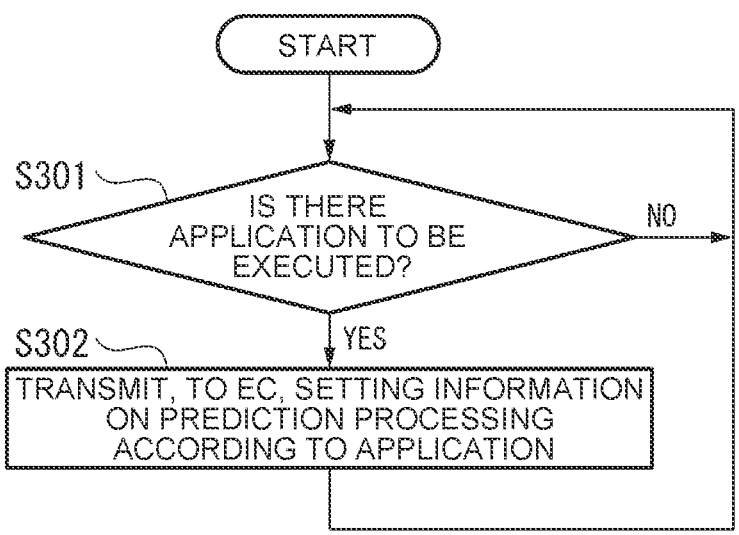
FIG. 13 is a table illustrating a data example of an application information storage unit.
FIG. 14 is a flowchart illustrating an example of the operation of a main control unit.

FIG. 13 is a table illustrating the data example of the application information storage unit 41*a* in the present embodiment.

As illustrated in FIG. 13, the application information storage unit 41*a* stores APID, AP name, and prediction setting in association with one another. Here, the APID is identification information for identifying an application, that is, an application ID. Further, the AP name indicates the name of the application. Further, the prediction setting indicates the setting of prediction processing in the embedded controller 31*a* when executing the application.

For example, when the prediction setting is "weak," it means that the setting of prediction processing in the embedded controller 31*a* is a weak setting (for example, to predict a short distance or the like), and when the prediction setting is "strong," it means that the setting of prediction processing in the embedded controller 31*a* is a strong setting (for example, to predict a long distance or the like). Further, when the prediction setting is "disabled," it means that the prediction processing is disabled not to execute the prediction processing.

For example, in the example illustrated in FIG. 13, in a case of an application whose APID and AP name are "AP001" and "XYZ," the prediction setting is "weak" (short distance prediction processing). Further, in a case of an application whose APID and AP name are "AP002" and "ZZZZ," the prediction setting is "strong" (long distance prediction processing). Further, in a case of an application whose APID and AP name are "AP003" and "ABCD," the prediction setting is "disabled" (not to execute the prediction processing).

Returning to FIG. 12, the main control unit 10*a* is a functional unit implemented by the CPU 11 and the chipset 21 executing programs stored in the main memory 12 to execute various processing based on the OS. The basic function of the main control unit 10*a* is the same as that of the main control unit 10 of the first embodiment. The main control unit 10*a* includes the pen input driver 101, a pen input setting unit 102a, an application management unit 103a, and the application 104.

The basic function of the pen input setting unit 102a is the same as the pen input setting unit 102 of the first embodiment. In response to a change request from the user, for example, the pen input setting unit 102a transmits, to the embedded controller 31a, changes in setting of prediction processing (for example, enabled or disabled, parameter and level settings of the prediction processing such as "strong" or "weak" described above, and the like).

The basic function of the application management unit 103a is the same as the application management unit 103 of the first embodiment. When an application to be executed on the OS is launched, the application management unit 103a refers to the application information storage unit 41a described above to check on the prediction setting corresponding to the launched application (APID and AP name) in order to notify the embedded controller 31a of setting information corresponding to the prediction setting, that is, in order to transmit, to the embedded controller 31a, a notification to change the prediction processing setting (for example, a setting change notification).

The embedded controller 31a is an embedded control unit different from the main control unit 10a, and the basic function of the embedded controller 31a is the same as the embedded controller 31 of the first embodiment. The embedded controller 31a includes the pen input buffer unit 311 and a pen input processing unit 312a.

The basic function of the pen input processing unit 312a is the same as the pen input processing unit 312 of the first embodiment. The pen input processing unit 312 executes the prediction processing of position detection data according to the settings set by the pen input setting unit 102 of the main control unit 10 in response to the setting change request, or set by the setting change notification from the application management unit 103a. The pen input processing unit 312a differs from the pen input processing unit 312 of the first embodiment in that the pen input processing unit 312a executes prediction processing corresponding to the setting change according to the application 104 in response to the setting change notification from the application management unit 103a. Since the other functions of the pen input processing unit 312a are the same as those of the pen input processing unit 312 of the first embodiment, the description thereof will be omitted here.

Next, the operation of the laptop PC 1a according to the present embodiment will be described with reference to the accompanying drawings.

FIG. 14 is a flowchart illustrating an example of the operation of the main control unit 10a in the present embodiment. Referring here to FIG. 14, processing in which the main control unit 10a monitors applications and transmits, to the embedded controller 31a, a notification to instruct setting information on the prediction processing of detection position data performed on the side of the embedded controller 31a will be described.

As illustrated in FIG. 14, the main control unit 10a first determines whether or not there is an application to be executed (step S301). The application management unit 103a of the main control unit 10a monitors applications executed on the OS and determines whether or not there is an application to be executed. When there is an application to be executed (there is an application to be launched) (step S301: YES), the application management unit 103a proceeds to a process in step S302. On the other hand, when there is no application to be executed (there is no application to be launched) (step S301: NO), the application management unit 103a returns to the process in step S301.

In step S102, the application management unit 103a transmits, to the embedded controller 31a, setting information on the prediction processing according to the application. The application management unit 103a refers to the application information storage unit 41a as illustrated in FIG. 13 to acquire the setting information on the prediction processing corresponding to the application to be executed. The application management unit 103a transmits, to the embedded controller 31a, a setting change notification including the acquired setting information. After the process in step S302, the application management unit 103a returns to the process in step S301.

Figure 15:
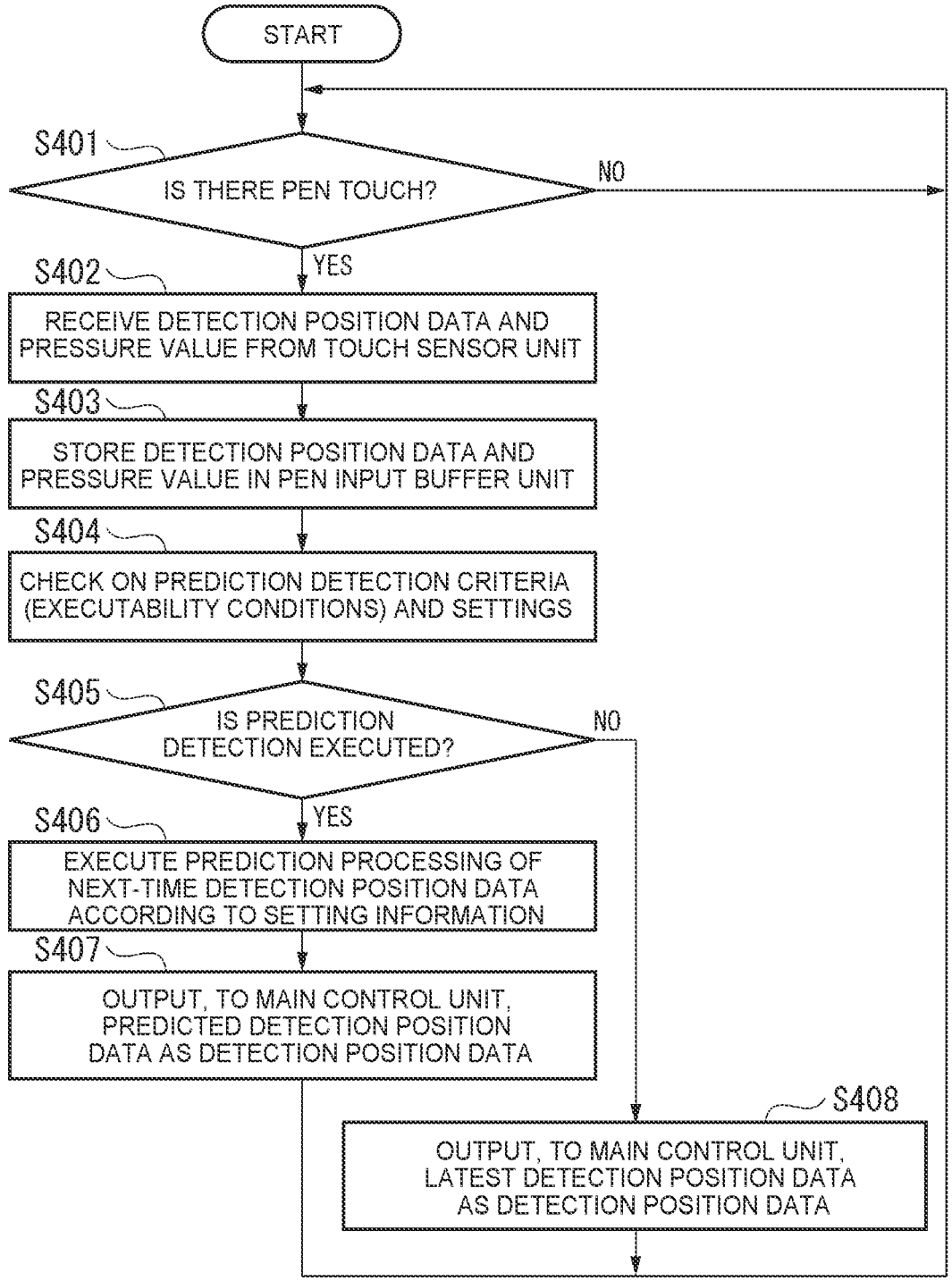
FIG. 15 is a flowchart illustrating an example of the operation of an embedded controller.

Referring next to FIG. 15, the operation of the embedded controller 31a in the present embodiment will be described.

FIG. 15 is a flowchart illustrating an example of the operation of the embedded controller 31a in the present embodiment. Note that the description will be made here by taking, as an example, a case of using the pen as the operation medium to perform pen input to the touch screen 20.

Since processes from step S401 to step S405 in FIG. 15 are the same as the processes from step S201 to step S205 illustrated in FIG. 10 described above, the description thereof will be omitted here.

In step S405, when the prediction processing of detection position data is executed (step S405: YES), the pen input processing unit 312a proceeds to a process in step S406. On the other hand, when the prediction processing of detection position data is not executed (step S405: NO), the pen input processing unit 312a proceeds to a process in step S408.

In step S406, the pen input processing unit 312a executes the prediction processing of next-time detection position data according to the setting information. Based on the plural pieces of detection position data stored in the pen input buffer unit 311, the pen input processing unit 312a executes the prediction processing, for example, according to the settings corresponding to the application 104 or the settings designated by the user to generate next-time detection position data (coordinate data on the screen of the display unit 14).

Next, the pen input processing unit 312a outputs, to the main control unit 10a, the predicted detection position data as detection position data (step S407). Note that in a case immediately after the prediction processing is enabled or the like, the pen input processing unit 312a outputs, to the main control unit 10a, both the latest detection position data among the plural pieces of detection position data stored in the pen input buffer unit 311 and the predicted detection position data as detection position data. After the process in step S407, the pen input processing unit 312a returns to the process in step S401.

Further, in step S408, the pen input processing unit 312a outputs, to the main control unit 10a, the latest detection position data as detection position data. In other words, the pen input processing unit 312a outputs, to the main control unit 10a, the latest detection position data among the plural pieces of detection position data stored in the pen input buffer unit 311. After the process in step S408, the pen input processing unit 312a returns to the process in step S401.

As described above, in the present embodiment, the main control unit 10a monitors the application 104 to be executed on the OS, and when the application 104 is launched, the main control unit 10a transmits, to the embedded controller 31a, setting information on the prediction processing according to the application 104. The embedded controller 31a uses the setting information on the prediction processing according to the application 104 to execute the prediction processing.

Thus, the laptop PC 1a according to the present embodiment can perform proper prediction processing according to the application 104 and hence can reduce an input-to-display delay.

Third Embodiment

Figure 16:
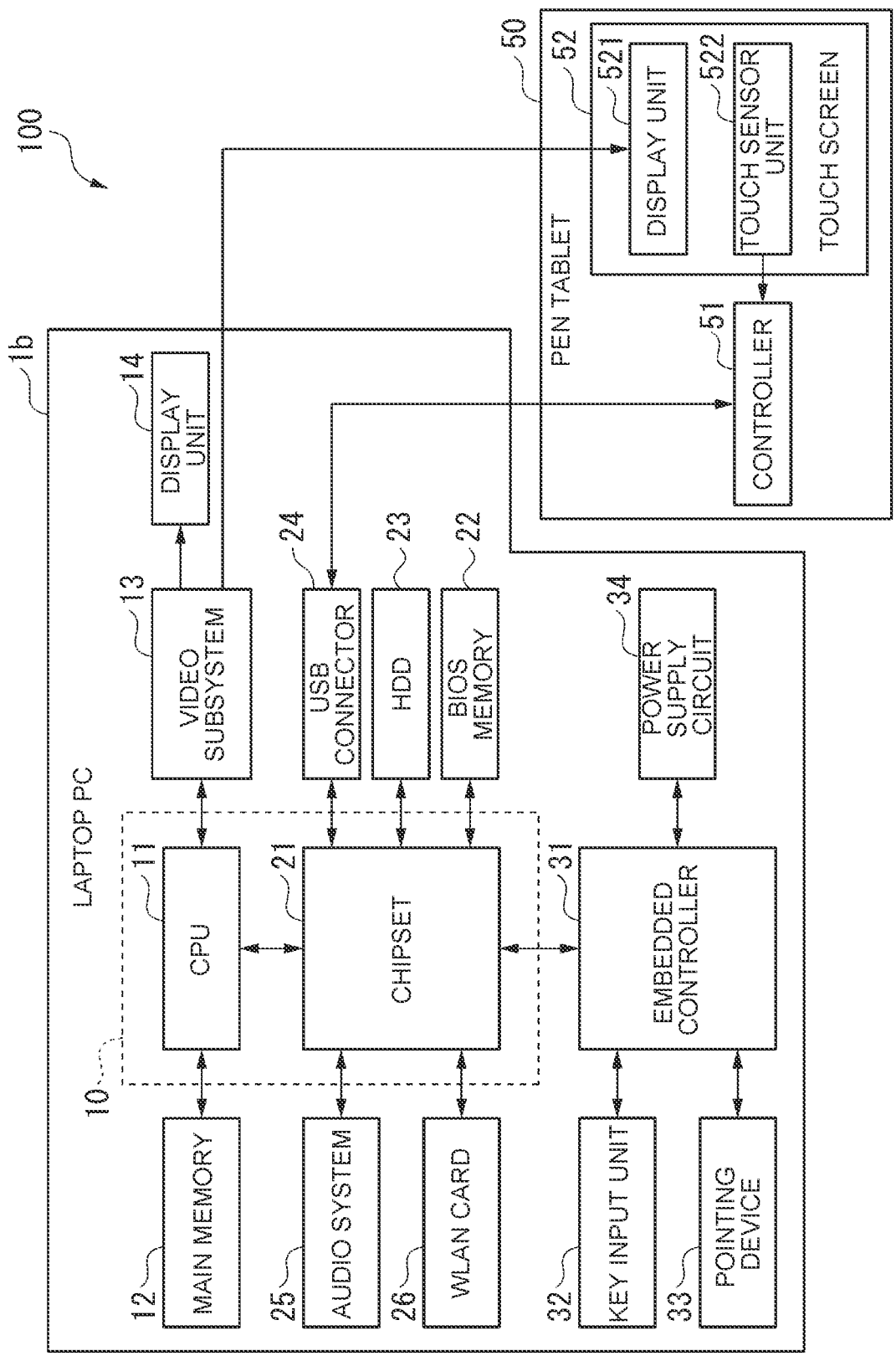
FIG. 16 is a diagram illustrating an example of the main hardware configuration of a PC system.

Referring next to FIG. 16, a PC system 100 according to a third embodiment will be described.

In the above-described first and second embodiments, the case where the touch screen 20 is provided inside the laptop PC 1 (1a) to perform handwriting input such as pen input is described. In the third embodiment, a modification when handwriting input such as pen input is performed by a PC system 100 including an external pen tablet 50 having a touch screen 52 and a laptop PC 1b will be described.

FIG. 16 is a diagram illustrating an example of the main hardware configuration of the PC system 100 according to the present embodiment.

As illustrated in FIG. 16, the PC system 100 (an example of an information processing system) includes the laptop PC 1b and the pen tablet 50.

Note that the same components as those in FIG. 1 are given the same reference numerals in FIG. 16 to omit the description thereof.

The laptop PC 1b (an example of an information processing apparatus) has the same hardware configuration as the laptop PC 1 (1a) described above except that the laptop PC 1b does not include the touch screen 20 (touch sensor unit 35).

The pen tablet 50 is a tablet terminal capable of handwriting input such as pen input, and includes a controller 51 and the touch screen 52.

For example, the controller 51 (an example of an embedded control unit) is a main processor including a CPU to centrally control the pen tablet 50. When performing processing for handwriting input such as pen input, the controller 51 executes the same processing as the embedded controller 31 (31a) described above. In other words, the controller 51 has the same functions as the pen input buffer unit 311 and the pen input processing unit 312 (312a) described above.

Further, the controller 51 is connected to the chipset (main control unit 10 (10a)) through the USB connector 24. The controller 51 uses the USB interface to output, to the main control unit 10 (10a), detection position data by the touch sensor unit 35.

The touch screen 52 includes a display unit 521 and a touch sensor unit 522 to function in the same manner as the touch screen 20 described above. The display unit 521 and the touch sensor unit 522 in the present embodiment correspond to the display unit 14 and the touch sensor unit 35 in the first and second embodiments.

The display unit 521 is connected to the main control unit 10 (10a) through the video subsystem 13, for example, by HDMI (High-Definition Multimedia Interface (registered trademark)) or DP (Display Port). Based on the detection position data output from the controller 51 by HDMI (registered trademark) or DP, the main control unit 10 (10a) displays, on the display unit 521, a movement trajectory of the operation medium moved on the screen while touching on the screen of the display unit 521.

Next, the operation of the PC system 100 according to the present embodiment will be described.

In the present embodiment, the controller 51 executes the prediction processing instead of the embedded controller (31a) of the first and second embodiments. Since the details of the prediction processing are the same as those in the first and second embodiments, the description thereof will be omitted here.

As described above, the PC system 100 (information processing system) according to the present embodiment includes the display unit 521, the touch sensor unit 522, the main control unit 10 (10a), and the controller 51. The touch sensor unit 522 is placed on the screen of the display unit 521 to detects a touch to an object on the screen. The main control unit 10 (10a) executes processing based on the OS.

The controller 51 is an embedded control unit different from the main control unit 10 (10a) to predict next-time detection position data based on plural pieces of detection position data on the screen detected by the touch sensor unit 522 at predetermined detection intervals as a result of the operation medium touching on the screen and output, to the main control unit 10 (10a), the predicted next-time detection position data as detection position data detected by the touch sensor unit 522.

Thus, the PC system 100 according to the present embodiment has the same effect as the above-described laptop PC 1 (1a), and an input-to-display delay can be reduced without depending on the application.

Note that the present disclosure is not limited to each of the aforementioned embodiments, and changes can be made without departing from the scope of the present disclosure.

For example, the example in which the information processing apparatus is the laptop PC 1 (1a, 1b) is described in each of the aforementioned embodiments, but the present disclosure is not limited to this example. For example, the information processing apparatus may also be any other type of information processing apparatus such as a tablet terminal or a desktop PC. Further, the information processing system is not limited to the PC system 100 including the laptop PC 1b, and it may also include any other type of information processing apparatus.

Further, in each of the aforementioned embodiments, the example in which prediction processing is executed when the distance D (total movement distance) between detection positions in Equation (1) is the predetermined threshold distance or more is described as an example of the first executability condition, but the first executability condition is not limited to this example. In the first executability condition, the distance between detection positions may also be determined based on any other parameter, such as an average distance among the plural pieces of detection position data, instead of the distance D between detection positions in Equation (1).

Further, in each of the aforementioned embodiments, the example in which prediction processing is not executed when the angle change dispersion VA in Equation (4) is the predetermined threshold value or more is described as an example of the second executability condition, but the second executability condition is not limited to this example. In the second executability condition, the change in moving angle of the operation medium may also be determined based on any other parameter, such as an average value of angle changes among the plural pieces of detection position data, instead of the angle change dispersion VA in Equation (4).

Further, in each of the aforementioned embodiments, the example in which prediction processing is not executed when the average value $A_{diff}$ of touch pressure drops in Equation (5) is the predetermined reference value or more is described as an example of the third executability condition, but the third executability condition is not limited to this example. In the third executability condition, any other parameter may also be used instead of the average value $A_{diff}$ of touch pressure drops in Equation (5) as long as it can determine pressure drops among the plural pieces of detection position data.

Note that each of the configurations of the laptop PC (1a) and the PC system 100 described above has a computer system therein. Then, a program for implementing the function of each component included in the laptop PC 1 (1a) and the PC system 100 described above may be recorded on a computer-readable recording medium so that the program recorded on this recording medium is read into the computer system and executed to perform processing in each component included in the laptop PC 1 (1a) and the PC system 100 described above. Here, the fact that "the program recorded on the recording medium is read into the computer system and executed" includes installing the program on the computer system. It is assumed that the "computer system" here includes the OS and hardware such as a peripheral device and the like.

Further, the "computer system" may also include two or more computers connected through a network including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. Thus, the recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the laptop PC 1(1a) and the PC system 100, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the above-described functions may be realized as an integrated circuit such as LSI (Large Scale Integration). Each of the above-described functions may be implemented as a processor individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An information processing apparatus comprising:
   a display;
   a touch sensor that is disposed on a screen of the display and that detects an input position by an input medium on the screen;
   a main controller that:
     comprises a main processor and a main memory, and
     executes processing based on an operating system (OS); and
   an embedded controller that:
     is separate from the main controller,
     comprises an embedded processor and an embedded memory,
     predicts a subsequent input position of the input medium based on detected input positions of the input medium detected by the touch sensor at predetermined detection intervals, and
     outputs, to the main controller, the predicted subsequent input position as part of the detected input positions detected by the touch sensor,
   wherein the main controller, based on the plurality of detected input positions received from the embedded controller, displays a movement trajectory of the input medium on the screen.

2. An information processing apparatus comprising:
   a display;
   a touch sensor that is disposed on a screen of the display and that detects a touch to an object on the screen;
   a main controller that executes processing based on an operating system (OS); and
   an embedded controller that:
     is different from the main controller,
     predicts next-time detection position data based on pieces of detection position data on the screen detected by the touch sensor at predetermined detection intervals as a result of touching on the screen with an operation medium, and
     outputs, to the main controller, the predicted next-time detection position data as detection position data detected by the touch sensor,
   wherein based on the detection position data output from the embedded controller, the main controller displays, on the display, a movement trajectory of the operation medium moved on the screen while touching on the screen.

3. The information processing apparatus according to claim 2, wherein the embedded controller switches between outputting or not outputting the predicted next-time detection position data as the detection position data according to predetermined executability conditions.

4. The information processing apparatus according to claim 3, wherein
   the executability conditions comprise a case where a distance between detection positions in the pieces of detection position data is a predetermined threshold distance or more, and
   when the distance between detection positions is the predetermined threshold distance or more, the embedded controller outputs the predicted next-time detection position data as the detection position data.

5. The information processing apparatus according to claim 3, wherein the executability conditions comprise a case where a change in moving angle of the operation medium at each of the predetermined detection intervals based on the pieces of detection position data is a predetermined threshold value or more, and when the change in moving angle is the predetermined threshold value or more, the embedded controller:

outputs latest detection position data detected by the touch sensor as the detection position data, and fails to output the predicted next-time detection position data as the detection position data.

6. The information processing apparatus according to claim 3, wherein the touch sensor detects a touch pressure of the operation medium on the screen together with the detection position data, the executability conditions comprise a case where each of drops in the touch pressure corresponding to the pieces of detection position data is a predetermined reference value or more, and when the touch pressure drop is the predetermined reference value or more, the embedded controller:

outputs latest detection position data detected by the touch sensor as the detection position data, and fails to output the predicted next-time detection position data as the detection position data.

7. The information processing apparatus according to claim 2, wherein the main controller monitors applications executed on the operating system, and when an application inside which next-time detection position data is predicted is launched, the main controller transmits, to the embedded controller, a notification to limit prediction processing for predicting the next-time detection position data, and the embedded controller limits the prediction processing in response to the notification to limit the prediction processing.

8. The information processing apparatus according to claim 7, wherein the notification to limit the prediction processing comprises a notification to stop the prediction processing, and the embedded controller:

stops the prediction processing in response to the notification to stop a function of the prediction processing, and outputs latest detection position data detected by the touch sensor as the detection position data.

9. A control method of an information processing apparatus comprising:

a display;

a touch sensor that is disposed on a screen of the display and that detects a touch to an object on the screen;

a main controller that executes processing based on an operating system (OS); and an embedded controller that is different from the main controller, the control method comprising:

predicting next-time detection position data:

based on pieces of detection position data on the screen, and detected by the touch sensor at predetermined detection intervals as a result of touching on the screen with an operation medium, and outputting, to the main controller, the predicted next-time detection position data as detection position data detected by the touch sensor; and displaying, on the display, a movement trajectory of the operation medium moved on the screen while touching on the screen based on the detection position data output from the embedded controller.

* * * * *